United States Patent
Yamamoto et al.

(10) Patent No.: US 7,318,960 B2
(45) Date of Patent: *Jan. 15, 2008

(54) POLARIZING MOLDED ARTICLE AND PROCESS FOR PREPARING THE SAME

(75) Inventors: Tamenobu Yamamoto, Higashiosaka (JP); Ryoji Kammori, Higashiosaka (JP); Nobuyuki Kobuchi, Higashiosaka (JP); Koichiro Oka, Higashiosaka (JP)

(73) Assignee: Yamamoto Kogaku Co., Ltd, Higashiosaka-Shi, Osaka (JP)

( * ) Notice: Subject to any disclaimer, the term of this patent is extended or adjusted under 35 U.S.C. 154(b) by 262 days.

This patent is subject to a terminal disclaimer.

(21) Appl. No.: 10/026,295

(22) Filed: Dec. 20, 2001

(65) Prior Publication Data

US 2002/0084023 A1    Jul. 4, 2002

(30) Foreign Application Priority Data

Dec. 20, 2000 (JP) .............................. 2000-387224

(51) Int. Cl.
B32B 27/34 (2006.01)
G02B 1/00 (2006.01)

(52) U.S. Cl. ............... 428/474.4; 428/474.7; 428/412; 428/423.5; 427/163.1

(58) Field of Classification Search ............. 428/423.5, 428/474.4, 474.7, 423.1, 412; 427/133, 163.1
See application file for complete search history.

(56) References Cited

U.S. PATENT DOCUMENTS

| | | | |
|---|---|---|---|
| 3,940,304 A | 2/1976 | Schuler | |
| 4,526,818 A * | 7/1985 | Hoshikawa et al. | 428/1.5 |
| 4,709,991 A * | 12/1987 | Hoshikawa | 349/122 |
| 5,412,505 A | 5/1995 | van Ligten et al. | |
| 5,702,813 A | 12/1997 | Murata et al. | |
| 5,751,481 A | 5/1998 | Dalzell et al. | |
| 5,757,459 A | 5/1998 | Bhalakia et al. | |
| 5,827,614 A | 10/1998 | Bhalakia et al. | |
| 5,909,314 A * | 6/1999 | Oka et al. | 359/582 |
| 6,165,392 A | 12/2000 | Kobuchi et al. | |
| 6,613,433 B2 * | 9/2003 | Yamamoto et al. | 428/411.1 |
| 6,659,608 B2 * | 12/2003 | Yamamoto et al. | 351/163 |
| 6,814,902 B2 * | 11/2004 | Yamamoto et al. | 264/1.7 |

FOREIGN PATENT DOCUMENTS

| | | |
|---|---|---|
| JP | 199 10 576 | 2/1985 |
| WO | WO 99/24243 | 5/1999 |

* cited by examiner

Primary Examiner—Thao Tran
(74) Attorney, Agent, or Firm—Kenyon & Kenyon LLP

(57) ABSTRACT

A polarizing molded article, which includes a polarizing plate-containing laminated structure. The laminated structure includes a polarizing sheet layer that is held between two protective sheet layers. One of the two protective sheet layers is connected to a polyurethane sheet layer or a polyamide sheet layer with an adhesive or a pressure-sensitive adhesive. A thermally molded resin layer is thermally adhered to the polyurethane sheet layer or the polyamide sheet layer.

12 Claims, 1 Drawing Sheet

POLARIZING MOLDED ARTICLE AND PROCESS FOR PREPARING THE SAME

FIELD OF THE INVENTION

Figure 1:
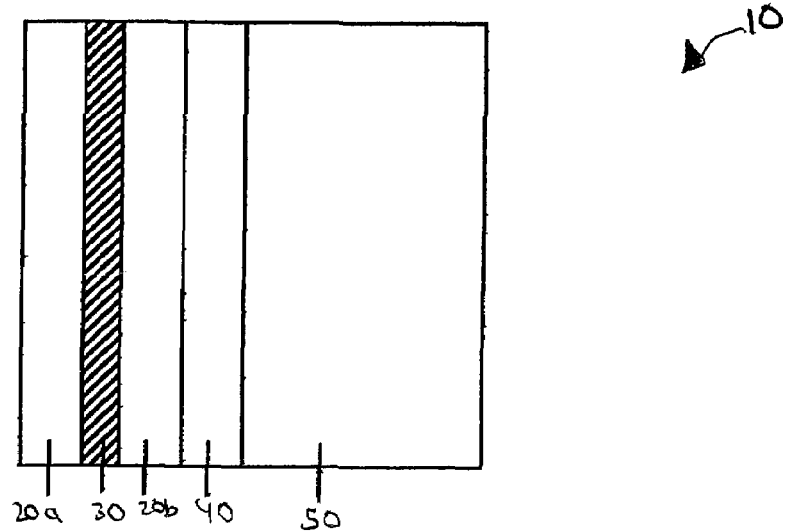
Figure 2:
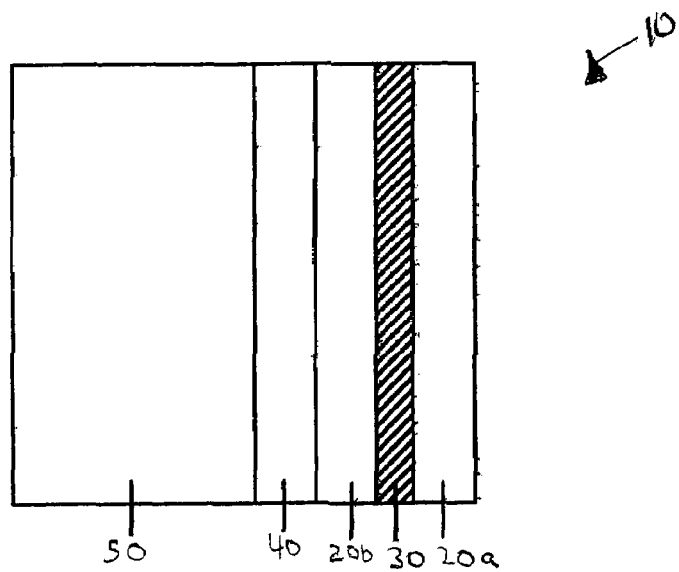

The present invention relates to the techniques for providing a polarizing molded article, with a polarizer incorporated, having the great impact strength, for example, lens substrates which are used in goggles, or sunglasses with or without degree which are resistant to the impact, and a process for preparing the same.

BACKGROUND OF THE INVENTION

Goggles and glasses used in sports fields such as skiing, snow boarding, ice skating, sailing, boating, biking and motorcycling, and industrial fields such as a general manufacturing industry, and a construction and a civil engineering industry, are used for the purpose of preventing dazzling due to the direct or reflected light, and protecting eyes from a wind, a snowflake, rain, seawater, water, sands, a chemical agent or a foreign body. In addition, general use sunglasses and sunglasses with or without degree are used for the purpose of preventing dazzling due to the ray and the reflected light.

Previously, there have been known a polarizing glass lens in which both sides of a polarizer sheet are covered with a glass, and a polarizing plastic lens obtained by cast molding by inserting a polarizer sheet into a mold, for example, a polarizing CR-39 lens.

Furthermore, there is known an optical composite molded article obtained by inserting into a mold a polarizing plate having a laminated structure in which a polarizer sheet is held between two polycarbonate sheets, which is insert injection-molded so as to thermally adhere a polycarbonate resin layer to a polycarbonate sheet (JP-A 8-52817).

The aforementioned polarizing glass sheet in which both sides of a polarizer sheet is covered with a glass, has the lack of the processibility resulting from easy breakage due to being a glass substrate, and from difficult deformation of a substrate.

In addition, the aforementioned polarizing plastic lens obtained by cast molding by inserting a polarizer sheet into a mold, has the problem that techniques are required to incorporate a polarizer sheet into a mold and that the polarizing ability is lowered due to shrinkage and thermal degradation of a polarizer sheet with the long term heat imparted thereto during cast molding.

Furthermore, the optical composite molded article obtained by insert injection molding so as to thermally adhere a polycarbonate resin layer to a polycarbonate sheet which is the outermost layer of a polarizing plate, as shown in JP-A 8-52817, has a problem that the polarizing ability is lowered due to shrinkage and thermal degradation of a polarizer sheet as in cast molding because a polarizing plate and a resin layer are too close and, thus, the heat at molding is transmitted directly to a polarizing plate.

SUMMARY OF THE INVENTION

The technical means of the present invention for solving the aforementioned technical problems is a polarizing molded article having a polarizing plate-containing laminated structure in which a polarizer sheet layer is held between two protective sheets, wherein one layer of the protective sheet layer and a polyurethane sheet layer or a polyamide sheet layer are connected with an adhesive or a pressure-sensitive adhesive, and the polyurethane sheet layer or the polyamide sheet layer and a thermally molding resin layer are thermally adhered.

Other technical means of the present invention is characterized in that the polyurethane sheet layer is a polyether series polyurethane sheet or a polyester series polyurethane sheet.

Other technical means of the present invention is characterized in that the polyamide sheet layer is a transparent polyamide sheet.

Other technical means of the present invention is characterized in that the thermally molding resin layer is made of a resin which can be thermally adhered to the polyurethane sheet layer or the polyamide sheet layer, selected from the group consisting of polyamide, thermoplastic polyurethane and polycarbonate.

Other technical means of the present invention is characterized in that the polyamide is transparent polyamide.

Other technical means of the present invention is characterized in that at least either side of the surface of the polarizing molded article is covered with at least one functional surface-processing coating selected from the group consisting of a hard coating, an anti-reflecting coating, an anti-fogging coating, an anti-staining coating and a mirror coating.

Other technical means of the present invention is characterized in that the polarizing molded article is an optical lens.

Other technical means of the present invention comprises a first step of preparing a polarizing plate having a structure in which a polarizer sheet layer is held between two protective sheet layers, a second step of preparing a polarizing composite in which a polyurethane sheet layer or a polyamide sheet layer is connected with one layer of the protective sheet layer for a polarizing plate with an adhesive or a pressure-sensitive adhesive, a third step of heat press-molding the polarizing composite into a spherical shaped body, and a fourth step of thermally molding a thermally molding resin layer on the spherical shaped polyurethane sheet layer or polyamide sheet layer.

Other technical means of the present invention is characterized in that a heat press molding machine for thermally press-molding a polarizing composite into a spherical shaped body is composed of a planar support which has a hole having a size similar to that of the spherical shaped body in a planar direction, a champ which secures the polarizing composite around the hole of the support, and a heatable anvil having a tip shape corresponding to a size and a curvature of the spherical shaped body, wherein the anvil has a structure fittable in the support, and wherein the third step of heat press-molding the polarizing composite into the spherical shaped body comprises [mounting a polarizing composite on the support-securing the polarizing composite on the support with a clamp-fitting the anvil and performing heat press molding-returning the anvil and the clamp to an original position-removing the spherical shaped body] as one cycle.

Other technical means of the present invention is characterized in that the polarizing composite is mounted on the support so that a polyurethane sheet layer or a polyamide sheet layer is on a lower side, heat press molding is performed so that the polyurethane sheet layer or the polyamide sheet layer is on a convex side of a spherical shaped body, and the formed spherical shaped body is reverted and, whereby, the spherical shaped body is arranged so that the polyurethane sheet layer or the polyamide sheet layer is on a concave side.

Other technical means of the present invention is characterized in that an insert injection molding machine is composed of a front mold having a curvature similar to that of the spherical shaped body and for securing the spherical shaped body, and a movable mold having an arbitrary curvature, wherein a fourth step of insert injection-molding a polarizing molded article comprises [arranging and securing the spherical shaped body on the front mold so that a polyurethane sheet layer or a polyamide sheet layer is inside a mold-clamping the movable mold-injection-molding a thermally molding resin layer-removing a polarizing molded article] as one cycle.

DETAILED DESCRIPTION OF THE INVENTION

The polarizing plate used in the present invention will be explained below. The polarizing plate in the present invention takes a laminated structure in which one polarizer sheet layer is held by two protective sheet layers.

The polarizer sheet layer is a monoaxially stretched sheet of a resin sheet such as polyvinyl alcohol, polyvinyl acetal and polyvinyl butyral, having a uniform thickness of 0.1 mm or smaller, or the monoaxially stretched sheet which is stabilization-treated, for example, into formal. Practically, the polarizer sheet layer has a polarization degree of 80% or greater, preferably 95% or greater.

In order to obtain a high polarization degree, the aforementioned monoaxially stretched sheet is doped with iodine or a dichromic pigment. In the polarizer sheet layer in the present invention, a polarizer sheet prepared by either of an iodine doping method or a pigment doping method can be used.

The iodine doping method using iodine imparts little inherent color to the polarizer sheet and a high polarization degree is easily obtained, while it has the defect that the heat resistance is inferior, as compared with a pigment doping method using a pigment. On the other hand, a pigment doping method imparts the higher heat resistance, while a hue inherent to a doping pigment appears in the polarizer sheet.

The protective sheet layer in the present invention is generally a sheet obtained by extrusion molding or cast molding.

As the protective sheet layer obtained by extrusion molding, a resin sheet having the high transparency, inter alia, a thermoplastic resin sheet is preferable.

Representative examples thereof include homopolymers such as polycarbonate series, polyamide series, polyester series, polyurethane series, polystyrene series, methyl methacrylate series and cyclohexyl methacrylate series, acrylic series and vinyl chloride series and their copolymers, polystyrene-methyl methacrylate series, acrylonitrile-styrene series, poly-4-methylpentene-1 series, hydrocarbon series having an adamantane ring or a cyclopentane ring on a main chain, and cellulose series.

It is desirable that a protective sheet for a polarizer sheet layer has as little optical anisotropy as possible. For decreasing formation of optical anisotropy, resins having a low photoelastic coefficient, for example, acetylcellulose such as triacetylcellulose and diacetylcellulose, propylcellulose such as tripropylcellulose and dipropylcellulose, polymethyl methacrylate, resins having a hydrocarbon series main chain and having an adamantane ring or a cyclopentane ring on the main chain, such as "ARTON" manufactured by JSR Corporation, "ZEONEX" manufactured by Nihon-Zeon Corporation, "APEL" manufactured by Mitsui Chemicals Co., Ltd., polyamide called transparent nylon or amorphous nylon, for example, "Grilamid TR-55" and "Grilamid TR-90" manufactured by EMS Co., Ltd., "Trogamid CX-7323" manufactured by Huels Ltd., polyurethane having the high transparency such as "Elastran" manufactured by Takeda Badisch Urethane Industries, Ltd. are suitably used. Inter alia, from a viewpoint of a low cost, acylcellulose such as acetylcellulose and propylcellulose series resins are preferably used in the present invention.

One aspect of an extrusion molding method is explained. There are a T dye method in which a polymer extruded in the melt state through a transversely elongated die is placed on a holding apparatus or a running belt, stretched in a longitudinal or transverse direction or, in the case of a polymer having a great photoelastic coefficient, is stretched not excessively in a longitudinal or transverse direction in order to suppress molecular orientation and, thereafter, which is solidified into a sheet, and a tubular method in which a resin is extruded into a balloon shape, followed by solidification. There is a tendency that the extrusion molding method has an advantage of preparing a sheet at a low cost, while it is inferior in the optical or apparent uniformity as compared with a cast molding method.

As a method for molding a protective sheet, it is preferable to use a cast method in order to obtain a sheet which is of as low optical anisotropy as possible and is uniform. A protective sheet obtained by a cast molding method is preferable since it has no orienting property, therefore, no thermally shrinking property. This is because a protective sheet is not thermally shrunk upon formation of a thermally molding resin layer for a polarizing molded article and, thus, a higher polarization degree can be maintained.

In a cast molding method in which cross-linking monomers such as diethylene glycol diallyl ether, diallyl phthalate and acrylic monomer as a main component, or polyurethane raw materials are polymerized between plates or cast into a sheet, a molded protective sheet has a high hardness or a barrier property and it can be suitably used in the present invention. However, excessive formation of cross-linking may lower the thermal moldability.

A solvent cast method in which the known polymer is dissolved in a solvent and, if necessary, a plasticizer is added, and the mixture is cast into a sheet and desolvated, can form a protective sheet at a relatively low cost. For this, it is preferable that the aforementioned resins have the nature of being dissolved in an easily desolvable solvent having a low boiling point solvent, at a high concentration.

As a resin suitable for solvent cast molding method, acylcelluloses such as triacetylcellulose, diacetylcellulose, tripropylcellulose and dipropylcellulose, resins having a hydrocarbon main chain and having an adamantane ring or a cyclopentane ring on the main chain, such as "ARTON" manufactured by JSR Corporation, "ZEONEX" manufactured by Nihon-Zeon Corporation, and "APEL" manufactured by Mitsui Chemicals Co., Ltd., polyamide resins such as polybisphenol A carbonate, and polymethyl methacrylate resins are recommended. Inter alia, from a viewpoint of high transparency, easy coloring and easy preparation of a sheet, acetylcellulose and propylcellulose are preferable.

One aspect of the solvent cast molding method is explained. A polymer solution which has been cast on a belt or a plate is dry-desolvated by heating or reduced pressure treatment, or is wet-desolvated by placing into a coagulating bath, whereby, a protective sheet is obtained. From a viewpoint of transparency and convenience of process, a dry-desolvating method is preferable.

A protective sheet molded by an extrusion molding method or a cast molding method having a thickness of around 0.01 to 1.55 mm, preferably around 0.02 to 1.2 mm is particularly suitably used. When the thickness is less than 0.01 mm, preparation itself of a protective sheet becomes difficult. On the other hand, when the thickness exceeds 1.5 mm, a total thickness of a polarizing plate increases too much and, thus, a thickness of a polarizing molded article increases. Further, when a protective sheet is prepared by a solvent cast molding method, uniform desolvation becomes difficult, leading to a tendency of an increase in a preparation cost.

In the present invention, a polarizing plate in which a protective sheet is applied to both sides of a polarizer sheet with an adhesive or a pressure-sensitive adhesive, such that the polarizer sheet is held between two two protective sheets, is recommended. An adhesive and a pressure-sensitive adhesive are both required to have the long term durability to water, the heat or the light, and both are basically not particularly limited as long as they satisfy the durability.

Examples of the adhesive include isocyanate series, polyurethane series, polythiourethane series, epoxy series, vinyl acetate series, acrylic series, and wax series adhesives. Examples of the pressure-sensitive adhesive include vinyl acetate series and acrylic series pressure-sensitive adhesives.

These adhesives and pressure-sensitive adhesives can be uniformly coated on a protective sheet or a polarizer sheet by the conventionally used coating method such as a gravure coating method and an offset coating method. A thickness of an adhesive layer or a pressure-sensitive adhesive layer is usually 0.1 to 100 µm, preferably 0.5 to 80 µm. When a thickness of an adhesive layer or a pressure-sensitive adhesive layer is less than 0.1 µm, the connecting force is low. When the thickness exceeds 100 µm, an adhesive or a pressure-sensitive adhesive bleeds out from an edge face of a polarizing molded article in some cases.

Respective sheets mentioned above can be connected by coating an adhesive or a pressure-sensitive adhesive in advance or immediately prior to application and, thereafter, piling them up directly from a roll or in the cut state, which is curing-treated as necessary.

In order to improve the force for connecting sheets with an adhesive layer or a pressure-sensitive adhesive layer, the surface of a protective sheet or a polarizer sheet may be treated, in some cases, by a chemical agent such as an acid or an alkali, ultraviolet-ray, plasma or corona discharge in advance.

A polarizing plate is usually a planar sheet.

Then, a polyurethane sheet layer or a polyamide sheet layer for thermally adhering a thermally molding resin layer is explained. In view of the thermal adherability with a thermally molding resin layer, polyurethane and polyamide are most suitable as a resin. In the present invention, a sheet layer used for this purpose is simply referred to as a polyurethane layer or a polyamide layer.

Polyurethane used for a polyurethane layer is thermosetting or thermoplastic.

In the case where polyurethane is thermosetting, a three- or more functional isocyanate compound, or a compound having three or more hydroxy groups in a molecule is partially used. In this case, a hardness and a barrier property of the resulting sheet are excellent. However, excessive formation of cross-linking may lead to deterioration of the thermal moldability and the thermal adherability with a thermally molding resin layer.

For this, in the present invention, a thermoplastic polyurethane obtained by polymerizing mainly a diisocyanate compound and a compound having two hydroxy groups in a molecule is preferable.

Examples of the diisocyanate compound include aromatic diisocyanates such as tolylene diisocyanate (TDI), methaxylene diisocyanate (MDI), diphenylmethane-4,4'-diisocyanate, diphenylether-4,4'-diisocyanate and 1,5-naphthalene diisocyanate, and aliphatic diisocyanates such as hexamethylene diisocyanate, isophorone diisocyanate, hydrogenated TDI and hydrogenated MDI. In the present invention, aliphatic diisocyanates having no yellowing property are particularly preferably used.

Examples of the compound having two hydroxy groups in a molecule include polyether series glycols such as polyethylene glycol, polypropylene glycol, polyethylene-propylene glycol and polytetramethylene glycol, ester series glycols such as caprolactone series, adipate series and copolyester series, carbonate series glycols, aliphatic series glycols such as ethylene glycol, 1,3-propane glycol, 1,4-butane glycol and 1,6-hexane glycol, and aromatic ring-containing glycols such as bisphenol A, ethylene oxide adduct of bisphenol A and propylene oxide adduct of bisphenol A.

In the present invention, from a viewpoint of no yellowing property, the melting property, the resistance to hydrolysis, the thermal adherability with a thermally molding resin layer and the amorphous property (transparency), the use of polyether series glycols or polyester series glycols is particularly suitable.

Polyurethane having a hardness of 75 or more, preferably 80 or more measured by JIS A method is particularly suitable in the present invention. When a hardness is less than 75, a sheet is too soft and, therefore, polyurethane is difficult to be formulated into a sheet.

Examples of polyurethane suitable in the present invention include 1180A, 1190ATR, 1195ATR, 1154D, 1164D, 1174D belonging to type "Elastran" 11 which is polyether series polyurethane manufactured by Takeda Badisch Urethane Industries, Ltd., and S80A, S85A, S90A and S95A belonging to type "Elastran" S which is polyester series polyurethane manufactured by the same company.

A polyurethane sheet can be prepared by a cast molding method or an extrusion molding method. In the case of the cast molding method, a mixture of isocyanate and a compound having a hydroxy group is poured between plates and molded by polymerization, or is cast into a sheet, which is molded by polymerization. In the latter method, a solvent may be used and the mixture is cast into a sheet, which is thereafter desolvated.

Alternatively, a solvent cast molding method can be adopted in which a preformed polymer is dissolved in a solvent, and the solution is cast into a sheet, which is desolvated. In the case of a solvent having a relatively high boiling point such as dimethylformamide, a wet method applies in many cases. A cast molding method is suitable for obtaining a uniform sheet.

An extrusion molding method is applied to a thermoplastic polyurethane. Although a sheet is obtained at a low cost, optical anisotropy becomes larger and uniformity of appearance is inferior in some cases.

Examples of polyamide used in a polyamide sheet layer include polycondensates of a diamine component such as hexamethylenediamine, m-xyleneamine, bis(p-aminocyclohexyl)methane, 3,3-dimethyl-4,4-diaminodicyclohexylmethane and trimethylhexamethylenediamine and a dicarboxylic acid component such as adipic acid, dodecanediacid, isophthalic acid and terephthalic acid, and polycondensates of lactams such as caprolactam. Inter alia, polyamide called "transparent type polyamide" or "amorphous type polyamide", for example, "Grilamid TR-55" and "Grilamid TR-90" manufactured by EMS Co., Ltd., and "Trogamid CX-7323" manufactured by Huels Ltd. are suitably used in the present invention because they have high transparency and little optical distorsion.

For formulating polyamide into a sheet, a solvent cast molding method or an extrusion molding method is generally used.

The thus molded polyurethane sheet or polyamide sheet having a thickness of around 0.01 to 1.5 mm, preferably, around 0.02 to 1.2 mm is particularly suitably used. When a thickness is below 0.01 mm, preparation itself of a sheet becomes difficult. On the other hand, when the thickness exceeds 1.5 mm, it causes an increase in a thickness of a polarizing molded article. Further, in the case where a sheet is prepared by a solvent cast molding method, uniform desolvation becomes difficult and it tends to increase a manufacturing cost.

For connecting one of the two protective sheets for a polarizing plate, and a polyurethane sheet or a polyamide sheet, a method of applying the polyurethane sheet or the polyamide sheet on one side of a polarizing plate with an adhesive or a pressure-sensitive adhesive is recommended. An adhesive and a pressure-sensitive adhesive are both required to have the long term durability to water, the heat and the light and both are not particularly limited basically as long as they satisfy the durability.

Examples of the adhesive include isocyanate series, polyurethane series, polythiourethane series, epoxy series, vinyl acetate series, acrylic series, and wax series adhesives. Examples of the pressure-sensitive adhesives include vinyl acetate series and acrylic series pressure-sensitive adhesives.

These adhesive and pressure-sensitive adhesive are uniformly coated on a connecting side of a polarizing plate or a polyurethane sheet or a polyamide sheet by the conventionally used coating method such as a gravure coating method and an offset coating method. A thickness of an adhesive layer or a pressure-sensitive adhesive layer is usually 0.1 to 100 μm, preferably 0.5 to 80 μm. When a thickness of an adhesive layer or a pressure-sensitive adhesive is less than 0.1 μm, the connecting force is low. When the thickness exceeds 100 μm, an adhesive or a pressure-sensitive adhesive bleeds out from an edge face of a polarizing molded article.

A polarizing plate and a polyurethane sheet or a polyamide sheet can be connected by a method of coating an adhesive or a pressure-sensitive adhesive in advance, or coating it immediately prior to application, piling them up directly from a roll or in the cut state, which is treated by curing, if necessary.

In order to improve the connecting force between layers with an adhesive or a pressure-sensitive adhesive, the surface of a polarizing plate, a polyurethane sheet or a polyamide sheet may be, in some cases, treated by a chemical agent such as an acid and an alkali, ultraviolet-ray, plasma, or corona discharge in advance.

A connected body of a polarizing plate and a polyurethane sheet or a polyamide sheet used in the present invention is hereinafter referred to as a polarizing composite. The polarizing composite is usually a planar sheet.

The polarizing molded article in the present invention is used in a lens-like shape in many cases. For such the purpose, either side of the polarizing molded article may be convex-shaped. For thermally adhering a thermally molding resin layer to a polyurethane sheet layer or a polyamide sheet layer of a polarizing composite, one of the surfaces of the polarizing molded article of the present invention is a protective sheet layer or a polarizing plate and the other is a thermally molding resin layer.

When molded in a lens-like shape, it is easy in terms of molding techniques to thermally mold so that a protective sheet side has a convex shape and a thermally molding resin layer side has a concave shape or a planar shape or a convex shape.

Formation of a protective sheet layer side into a convex shape necessarily leads to a spherical shaped body in which a protective sheet layer side of the polarizing composite is a convex shape and a polyurethane sheet layer or a polyamide sheet layer side is a concave shape. In such the shaped body, it is generally recommended that a polarizing composite is thermally shaped into a spherical shape in advance at a stage prior to thermally adhering of a thermally molding resin layer.

As a method of thermally shaping a polarizing composite as described above, the use of a heat press molding apparatus will be explained below.

The heat press molding apparatus is generally composed of a movable mold and a front mold. Either of the movable mold and the front mold is a male type, and the other is a female type. Heat press and shaping are performed by holding a polarizing composite between both shapes and combining both shapes.

A heat press method has the following combinations depending upon a mold shape and the presence or the absence of heating.

Case 1 The case where a male type is pushed against a polarizing composite, which is molded into a spherical shape. A tip of a male type has a spherical shape into which shaping is desired and that part is heated. As a front mold, a spherical shaped female type is not necessarily required.

Case 2 The case where a spherical shaped body is molded by a female type. A concave surface of a female type has a spherical shape into which shaping is desired and that part is heated. A male type is necessary but a tip shape may be of rubber nature and may be deformable. It is not necessary to heat a male type.

Case 3 The case where a spherical shaped body is molded by both male and female types. A tip of a male type and a concave surface of a female type have a spherical shape into which shaping is desired and at least one of them is heating.

In the present invention, any of the above methods can be applied. From a viewpoint of the appearance of a molded article and the reproductivity, case 1 is particularly suitably used. Inter alia, a heat press molding machine is composed of a planar support having a hole of a size similar to that of a spherical shaped body in a planar direction, a clamp for securing a polarizing composite around a hole of a support and a heatable anvil having a tip shape corresponding to a size and a curvature of a spherical shaped body in a planer direction, wherein the anvil has a structure fittable in a support.

In order to obtain a uniform spherical shaped body, a hole of a heat press apparatus is generally circular. A clamp is generally ring-like shaped and secures a polarizing composite concentrically in the hole.

Here, a support and an anvil correspond to a mold, and one of them is a movable mold and the other is a front mold. In the present invention, the case where an anvil is a movable mold is preferable because a machine structure can be simplified.

In addition, an anvil corresponds to a male type, and its tip is made so as to have a curvature of a spherical shaped body into which shaping is desired. The anvil has a mechanism which can be heated to a constant temperature by a heater or a heating medium.

In this case, there is not a member corresponding to a female type, a polarizing composite is secured by a planar support having a hole of a size similar to that of a spherical shaped body and a ring-like clamp for securing it around the hole concentrically, and the anvil is pushed against the polarizing composite, which is further fitted in the hole of the support and heat-pressed into a desired spherical shaped body.

It is preferable that a temperature of the anvil is higher than a transition temperature of a sheet layer which plays a role in imparting the shapability among sheet layers constituting the polarizing composite. Generally, the temperature is around 90-200° C. After heat press molding, for example, cooling operations may be performed such as blasting the air to the spherical shaped body.

Upon heat press molding, an operational procedure comprises [mounting a polarizing composite on a support-securing a polarizing composite on a support with a clamp-fitting an anvil and molding by heat press-returning the anvil and the clamp to an original position-removing a spherical shaped body] as one cycle.

A polarizing composite before heat press molding is usually prepared as a large sheet having a constant polarization direction. In that state, since the sheet is too large to be mounted on a support and is not economically suitable, it is generally cut with a punching apparatus in advance. In that case, in order to make a polarization direction after cutting clear, it is advantageous to impart a projection or a notch mark for showing a polarization direction to the cut polarizing composite, from a viewpoint of later procedures.

In addition, a polarizing composite may be mounted on a heat press apparatus so that either side of a polarizing composite is on a concave shaped side. For example, when a polyurethane sheet layer or a polyamide sheet layer is arranged on a concave shaped side, a finished spherical shaped body is used as it is. When a protective sheet layer is arranged on a concave shaped side, a finished spherical shaped body is reverted so that a polyurethane sheet layer or a polyamide sheet layer is on a concave shaped side, which is used.

When, in particular, acylcelluloses such as triacetylcellulose, diacetylcellulose, tripropylcellulose and dipropylcellulose are used as a protective sheet, in order to smoothly thermally mold into a spherical shape, it is recommended that a polarizing composite is mounted on a heat press apparatus so that a protective sheet layer is on a heating side. For example, when case 1 is adopted, a polarizing composite is mounted so that a protective sheet layer made of acylcellulose is on a concave side, a finished spherical shaped body is reverted, and the spherical shaped body is arranged so that a polyurethane sheet layer or a polyamide sheet layer is on a concave side.

After heat press molding, an unnecessary part at a periphery of a spherical shaped body is usually cut and removed with a punching apparatus. Also in this case, in order to make a polarization direction after cutting clear, it is advantageous to impart a projection or a notch for showing a polarization direction to the cut spherical shaped body, from a viewpoint of later procedures.

Then, a thermally molding resin layer in the present invention will be explained. Examples of the thermally molding resin layer which is suitably used include thermoplastic resins such as homopolymers such as polyamide series, polyurethane series, polyester series, polycarbonate series, polystyrene series, methyl methacrylate series and cyclohexyl methacrylate series, acrylic series and vinyl chloride series and their copolymers, polystyrene-methyl methacrylate series, acrylonitrile-styrene series, poly-4-methylpentene-1 series, hydrocarbon series having an adamantine ring or a cyclopentane ring on a main chain, and cellulose series, a representative of which is triacetylcellulose.

In the present invention, a thermally molding resin is not particularly limited as long as it is a thermoplastic resin which thermally adheres to a polyurethane sheet layer or a polyamide sheet layer of a polarizing composite. From a viewpoint of the heat adherability, the optical uniformity, the transparency, impact resistance and the heat moldability, a thermally molding resin which is particularly preferably used in a thermally molding resin layer is polyamide, thermoplastic polyurethane and polycarbonate.

Examples of polyamide include polycondensates of a diamine component such as hexamethylenediamine, m-xyleneamine, bis(p-aminocyclohexyl)methane, 3,3-dimethyl-4,4-diaminodicyclohexylmethane and trimethylhexamethylenediamine and a dicarboxylic acid component such as adipic acid, dodecanediacid, isophthalic acid and terephthalic acid, and polycondensates of lactams such as caprolactam. Among them, polyamides called as transparent nylon or amorphous nylon, for example, "Grilamid TR-55" and "Grilamid TR-90" manufactured by EMS Co., Ltd., "Trogamid CX-7323" manufactured by Huels Ltd., have the high transparency or small optical distortion and, thus, they are suitably used in the present invention.

It is preferable that the thermoplastic polyurethane is thermoplastic polyurethane obtained by polymerizing a diisocyanate compound and a compound having two hydroxy groups in a molecule.

Examples of the diisocyanate compound include aromatic diisocyanates such as tolylene diisocyanate (TDI), methaxylene diisocyanate (MDI), diphenylmethane-4,4'-diisocyanate, diphenylether-4,4'-diisocyanate and 1,5-naphthalenediisocyanate, and aliphatic diisocyanates such as hexamethylene diisocyanate, isophorone diisocyanate, hydrogenated TDI and hydrogenated MDI. In the present invention, aliphatic diisocyanates having no yellowing property are particularly preferably used.

Examples of the compound having two hydroxy groups in a molecule include polyether series glycols such as polyethylene glycol, polypropylene glycol, polyethylene-propylene glycol and polytetramethylene glycol, ester series glycols such as caprolactone series, adipate series and copolyester series, carbonate series glycols, aliphatic series glycols such as ethylene glycol, 1,3-propane glycol, 1,4-butane glycol and 1,6-hexane glycol, and aromatic ring-containing glycols such as bisphenol A, ethylene oxide adduct of bisphenol A and propylene oxide adduct of bisphenol A.

In the present invention, from a viewpoint of no yellowing property, the melting property, the resistance to hydrolysis, the thermal adherability with a thermally molding resin layer and the amorphous property (transparency), the use of polyether series glycols is particularly suitable.

Examples of polycarbonate include polybisphenol A carbonate, and homopolymer polycarbonates such as 1,1'-dihydroxydiphenyl-phenylmethylmethane, 1,1'-dihydroxydiphenyl-diphenylmethane, and 1,1'-dihydroxy-3,3'- dimethylphenyl-2,2-propane, and copolymer polycarbonates thereof, and copolymer polycarbonates with bisphenol A.

Generally, polycarbonate has a defect that it has too large birefringence. That is, optical anisotropy is easily caused derived from molding distortion or local orientation in the interior of the molded article. For this reason, when polycarbonate is used in the present invention, it is important to prevent formation of optical anisotropy to the utmost. As the strategy, it is preferable to use a resin of a relatively low polymerization degree which has the high flowability and hardly undergoes the excess shearing force at molding, that is, hardly causes remaining distortion or local orientation. In the present invention, it is recommended to use polycarbonate having a polymerization degree of 120 or smaller, more preferably 100 or smaller.

It is necessary to thermally adhere a polyurethane sheet layer or a polyamide sheet layer of a polarizing composite with a thermally molding resin layer at a practical level of the adhering strength. Generally, there is a tendency that when a molding temperature of a thermally molding resin layer is higher than a softening temperature of a polyurethane sheet layer or a polyamide sheet layer, the thermal adherability of both layers is increased.

In a polarizing molded article in the present invention, a combination of a polyurethane sheet layer and a polyamide thermally molding resin layer, and that of a polyamide sheet layer and a polyamide thermally molding resin layer are particularly preferable from a viewpoint of the transparency, the resistance to solvent crack, the resin curing degree and the adherability.

A method of thermally adhering a thermally molding resin layer with a polyurethane sheet layer or a polyamide sheet layer will be explained below by referring to a thermal molding method.

A thermal molding refers to forcing a thermally melt resin into a mold and molding it, such as a compression molding method, a transfer molding method and an injection molding method. From a viewpoint of the productivity and the precision, an insert injection molding method shown in Japanese Patent Application No. 10-49707 is basically preferable. That is, it is a method in which a polarizing composite with a thermally adhering side facing inwardly is mounted on one side of a mold, and a resin layer is injection-molded on that side.

In this case, since a polarizing molded body is lens-like in many cases, a polarizing composite in which a concave surface is thermally press-molded by a spherical mold into a spherical shape having an approximately same curvature as that of this mold is used in many cases.

Upon insert injection molding, when a direction of a resin which flows in through a gate is consistent with a main axis of polarization of the spherical shaped layer (an orienting direction of a polarizer), a polarizing molded article having a high polarizing property is easily obtained. This is particularly preferable method in the case of a resin having the high optical anisotropy. As its measure, a projection or a notch, for showing a polarization direction, provided on a spherical shaped body is utilized.

When a mark for showing a polarization direction (a carved stamp, a projection or a recess which can be marked on a polarizing molded article) is provided on a mold, a polarization direction of a polarizing molded article can be discriminated only from the appearance after molding.

Insert injection molding comprises as an operational procedure [mounting and securing a spherical shaped body on a front mold so that a polyurethane sheet layer or a polyamide sheet layer is inside a mold-clamping a movable mold-injection-molding a thermally molding resin layer-removing a polarizing molded article] as one cycle. By sucking a spherical shaped body through a suction hole provided in a front mold when the spherical shaped body is mounted and fixed on the front mold, a polarizing molded body can be formed into a more precise shape in some cases.

An insert type injection compression molding method is preferable for such the utilities that require the precision, such as sunglasses, goggles, and correcting lenses. Since a resin is injected into a mold at a low pressure and, thereafter, a mold is closed at a high pressure and the compressing force is applied thereto in an injection compression molding method, optical anisotropy resulting from molding distortion or local orientation at molding is hardly caused in a molded article. Since a resin can be cooled at a constant specific volume by controlling a mold compression force applied uniformly to a resin, molded articles having a high dimensional precision can be obtained. This is particularly preferably applied to a polycarbonate series resin having a large birefringence.

When a thickness of a polarizing composite in the present invention is A and a thickness of a thermally molding resin layer is B, A is usually a uniform thickness of around 0.03 mm to 3 mm over a whole region of an optical composite of the present invention. On the other hand, there are a case where B is a uniform thickness, and a case where a thickness varies continuously from a central part to a periphery, such as a lens with minus degree or a lens with plus degree. Usually, a thermally molding resin layer is molded so that a thickness B is at least 1 mm and this is different depending upon the flowability of a resin used in molding and design of a polarizing molded article.

It is preferable that at least either side of the surface of the polarizing molded article of the present invention is processed by hard coating. Examples of the hard coating include any type of hard coatings which are generally used, such as thermosetting type hard coatings such as silane series and epoxy series hard coatings, active ray curing type hard coatings such as acrylic series and epoxy series hard coatings. Usually, a hard coating is imparted at a thickness of around 0.5 to 15 µm. occasionally, for improving the adherability of a hard coating, a hard coating is imparted on a coating of a primer coating layer such as acrylate series coating layer.

It is preferable that at least either side of the surface of a polarizing molded article in the present invention is anti-reflecting-processed. Anti-reflecting processing is performed by laminating around 2 to 8 layers of inorganic films having a refractive index which is different between adjacent layers at an optical film thickness by a vacuum deposition method, or laminating around 1 to 3 layers of organic films at an optical film thickness by a wet method.

In addition, it is preferable that at least either side of the surface of a polarizing molded article of the present invention is anti-fogging-processed. Anti-fogging processing is carried out by applying a hydrophilic resin such as polyvinyl alcohol series or polyvinyl pyrrolidone series, at a thickness of around 1 to 50 µm. In the case of an acetylcellulose series resin, the anti-fogging property can be imparted by saponification-treating the surface.

In addition, it is preferable that at least either side of the surface of a polarizing molded article in the present invention is anti-staining-processed. Anti-staining processing is carried out by applying a fluorine series organic compound at a thickness of a few tens nm to µm order by a vacuum deposition method or a wet method for the purpose of preventing staining of an anti-reflecting film with organic substances such as staining with fingerprint and making wiping easy. In addition, it is preferable that either side of the surface of a polarizing molded article of the present invention is mirror-processed. Mirror processing is carried out by imparting a metal film such as aluminium, silver, gold and platinum on a hard coating by a vacuum deposition method.

The following Examples illustrate the present invention specifically but the scope of the present invention is not limited by them.

EXAMPLE 1

A polarizing plate (manufactured by Sumitomo Chemical Company Limited) in which a polarizer sheet having a thickness of about 40 μm is held between two TAC (triacetylcellulose) sheets having a thickness of about 80 μm as a protective sheet layer, was obtained.

A sheet having a thickness of about 200 μm was prepared by an extrusion molding method using polyether series polyutethane "Elastran 1195ATR" (manufactured by Takeda Badisch Urethane Industries, Ltd.) (JIS A hardness 95) as a polyurethane sheet layer, was obtained.

A sheet, on one side of which an acrylic series pressure-sensitive adhesive "Saibinol AT-250" (manufactured by Saiden Chemical Co., Ltd.) had been applied at a thickness of about 30 μm, was obtained.

The above polyurethane sheet was applied to one side of the above polarizing plate to prepare a polarizing composite.

By using this polarizing composite, a circular sheet having a diameter of 100 mm was punched with a punching apparatus equipped with a punching blade having a diameter of 100 mm. In this case, a part of the punching blade was provided with a small projection for showing a polarization direction, a polarizing composite was set so that a polarization direction of the polarizing composite was consistent with this mark, and a circular sheet with a small projection was punched. The sheet after punching was thermally molded into a spherical shaped body using a heat press molding machine described below.

The heat press molding machine was composed of a planar support having a hole diameter of 84 mm, a ring-like clamp having an inner diameter of 88 mm for securing a polarizing composite concentrically around a hole on the support, and a heatable anvil having a 8C (curve) convex tip shape of a diameter of 82 mm and having a structure which is fittable in the hole on the support from an upper side.

Heat press molding was carried out as follows: A polarizing composite was arranged concentrically on a hole of a support of a heat press apparatus so that an upper side was a TAC protective sheet layer of a polarizing plate and a lower side was a polyurethane sheet layer. The polarizing composite was secured with a ring-like clamp. Subsequently, an anvil heated to 140° C. was fitted in a hole of a support on an upper part of a polarizing composite, and the polarizing composite was heat press-molded so that it had a 8C spherical shape. The anvil was returned to an original position, the spherical shaped body was cooled and the ring-like clamp was returned to an original position. Thereafter, the 8C spherical shaped body was removed from the support.

An unnecessary part at a periphery of the spherical shaped body was cut and removed with a circular punching machine having a diameter of 77 mm. Also in this case, a part of a punching blade was provided with a small projection for showing a polarization direction, the spherical shaped body was set so that a polarization direction of the spherical shaped body was consistent with this mark, and the spherical shaped body with a small projection having a diameter of 77 mm in which a convex side was a polyurethane sheet layer and a concave side was a TAC protective sheet layer, was punched.

Thereafter, the finished spherical shaped body was reverted so that the TAC protective sheet layer was on a convex side and the polyurethane sheet layer was on a concave side.

A polarizing molded article was prepared as follows:

An insert injection compression molding machine is provided with a 8C concave front mold which can secure a spherical shaped body and a 8C convex movable mold.

Using this apparatus, the resulting 8C spherical shaped body was set and secured in the concave front mold. In this case, the spherical shaped body was arranged so that a TAC protective sheet layer of the spherical shaped body adhered to the front mold and a polyurethane sheet layer faced the movable mold. The front mold and the movable mold both having a structure which can impart a small projection for showing a polarization direction to a part at a periphery of a polarizing molded body, were used.

The movable mold was clamped on the front mold to form a cavity for molding between the front mold and the movable mold.

As a thermally molding resin layer, transparent type polyamide "Grilamid TR-90" (manufactured by EMS Co., Ltd.) in which a smoke color pigment had been dissolved, was used. A polarizing molded article was injection compression-molded at a highest temperature of 280° C. and a polyurethane sheet layer and a thermally molding resin layer were adhered. Thereafter, the polarizing molded article was removed from the insert injection compression molding machine.

The resulting polarizing molded article is a 8C planolens having a thickness of 2.2 mm in which a TAC protective sheet was arranged on a convex side and a thermally molding resin layer of transparent type polyamide was incorporated and arranged on a concave side.

A silane series hard coating film having a thickness of about 2.5 μm was formed on both sides of the same article.

The finished lens had the visible light transmittance of 20% measured at its central part, and exhibited the extremely tough mechanical properties. It had a polarization degree of 98% or greater.

EXAMPLE 2

According to the same manner as that of Example 1 except that a sheet having a thickness of about 200 μm which had been prepared by extrusion-molding polyether series polyurethane "Elastran 1164D" (manufactured by Takeda Badisch Urethane Industries, Ltd.) (JIS A hardness 95 or greater) was used as a protective sheet layer, a 8C spherical shaped body was prepared.

This spherical shaped body was secured in a front mold of an insert injection compression molding machine as in Example 1 and a movable mold was clamped as in Example 1. As a thermally molding resin layer, non-colored transparent type polyamide "Trogamid CX-7323" (manufactured by Daisel Huels, Ltd.) was used. A polarizing molded article was injection compression-molded at a highest temperature of 280° C. and a polyurethane sheet layer and a thermally molding resin layer were thermally adhered. Thereafter, the polarizing molded article was removed from the insert injection compression molding machine.

The front mold and the movable mold both having a structure which can impart a small projection for showing a polarization direction to a part at a periphery of a polarizing molded article, were used.

The resulting polarizing molded article is a 8C semi-finished lens having a thickness of 13 mm in which a TAC protective sheet was arranged on a convex side and a thermally molding resin layer of transparent nylon was incorporated and arranged on a concave side.

A rear side of this lens was abraded to prepare a minus lens of −4.00 D (diopter) having a center thickness of about 2 mm.

A silane series hard coating having a thickness of about 2.5 μm was coated on both sides of the same article, and 4 layers of $ZrO_2$ and $SiO_2$ were alternately laminated on both sides at an optical thickness by a vacuum deposition method to obtain an anti-reflecting film. Further, a fluorine series anti-staining film having a thickness of about 20 nm was coated on the anti-reflecting film.

The finished lens had the visible light transmittance of about 48% measured at a center part, and exhibited the extremely tough mechanical properties. A polarization degree was 98% or greater.

EXAMPLE 3

The polarizing plate used in Example 1 was obtained.

As a polyamide sheet layer, a sheet of transparent type polyamide "Grilamid TR-90" (manufactured by EMS Co., Ltd.) having a thickness of about 200 mm was obtained.

On one side thereof was coated a pressure-sensitive adhesive "Saibinol AT-250" used in Example 1 at a thickness of about 30 μm. The above transparent type polyamide sheet was applied on one side of the above polarizing plate to prepare a polarizing composite.

Using this polarizing composite, a circular sheet having a diameter of 100 mm was punched with a punching apparatus equipped with a punching blade having a diameter of 100 mm. In this case, a part of the punching blade was provided with a small projection for showing a polarization direction, and the polarizing composite was set so that a polarization direction of the polarization composite was consistent with this mark, and a circular sheet with a small projection was punched.

A sheet after punching was heat press-molded into a 8C spherical shaped body using the same heat press apparatus as that in Example 1 by a method described below.

The polarizing composite was arranged concentrically on a hole of a support of the heat press apparatus so that an upper side was a TAC protective sheet layer and a lower side was a transparent type polyamide sheet layer. The polarizing composite was secured with a ring-like clamp. Subsequently, an anvil heated to 140° C. was fitted into a hole of a support on an upper part of the polarizing composite, which was heat press-molded so that the polarizing composite had a 8C spherical shape. The anvil was returned to an original position, the spherical shaped body was cooled and the ring-like clamp was returned to an original position. Thereafter, the 8C spherical shaped body was removed from the support.

An unnecessary part at a periphery of the spherical shaped body was cut and removed with a circular punching machine having a diameter of 77 mm. Also in this case, a part of a punching blade was provided with a small projection for showing a polarization direction, the spherical shaped body was set so that a polarization direction of the spherical shaped body was consistent with this mark, and the spherical shaped body with a small projection having a diameter of 77 mm in which a convex side was a transparent type polyamide sheet layer and a concave side was a TAC protective sheet layer, was punched.

Thereafter, the finished spherical shaped body was reverted so that the TAC protective sheet layer was on a convex side and the transparent type polyamide sheet layer was on a concave side.

Using the same insert injection compression molding machine and mold as those in Example 1, a polarizing molded article was prepared as follows:

The resulting 8C spherical shaped body was set and secured in a convex front mold. In this case, the spherical shaped body was arranged so that the TAC protective sheet layer of the spherical shaped body adhered to a front mold and the transparent type polyamide sheet layer faced the movable mold.

The movable mold was clamped on the front mold to form a cavity for molding between the front mold and the movable mold.

As a thermally molding resin layer, transparent type polyamide "Trogamid CX-7323" in which a smoke color pigment had been dissolved, was used. A polarizing molded article was injection compression-molded at a highest temperature of 280° C., and the transparent type polyamide layer and the thermally molding resin layer were thermally adhered. Thereafter, the polarizing molded article was removed from the insert injection compression molding machine.

The resulting polarizing molded article is a 8C planolens having a thickness of 2.2 mm in which the TAC protective sheet was arranged on a convex side and the thermally molding resin layer of transparent type polyamide was incorporated and arranged on a concave side.

On both sides of the same article was formed a silane series hard coating film having a thickness of about 2.5 μm. Further, on a convex side was formed a polyvinyl alcohol series anti-fogging film.

The finished lens had the visible light transmittance of 21% measured at a center part, and exhibited the extremely tough mechanical properties. It had a polarization degree of 98% or grater.

EXAMPLE 4

As a protective sheet, a polycarbonate sheet having a thickness of about 170 μm which had been prepared from a bisphenol series carbonate resin, was used. A polarizing plate in which a polarizer sheet having a thickness of about 40 μm was applied and held between those two sheets via an adhesive layer having a thickness of about 20 μm (manufactured by Tsutsunaka Plastic Co., Ltd.) was prepared. On one side of the polarizing plate was applied the polyurethane sheet with a pressure-sensitive adhesive used in Example 1 to prepare a polarizing composite.

Using this polarizing composite, a circular sheet having a diameter of 100 mm was punched with a punching apparatus equipped with a punching blade having a diameter of 100 mm. In this case, a part of the punching blade was provided with a small projection for showing a polarization direction, and the polarizing composite was set so that a polarization direction of the polarizing composite was consistent with this mark, and a circular sheet with a small projection was punched.

The sheet after punching was heat press-molded into a 8C spherical shaped body using the same heat press apparatus as that in Example 1 by a method described below.

The polarizing composite was arranged concentrically on a hole of a support of a heat press apparatus so that an upper side was a polyurethane sheet layer and a lower side was a polycarbonate protective sheet layer of the polarizing plate. The polarizing sheet composite was secured with a ring-like clamp. Subsequently, an anvil heated to 140° C. was fitted in the hole of the support on an upper part of the polarizing composite, which was heat press-molded so that the polarizing composite had a 8C spherical shape. The anvil was returned to an original position, the spherical shaped body was cooled, and the ring-like clamp was returned to an original position. Thereafter, the 8C spherical shaped body was removed from the support.

An unnecessary part at a periphery of the spherical shaped body was cut and removed with a circular punching machine having a diameter of 77 m. Also in this case, a part of a punching blade was provided with a small projection for showing a polarization direction, the spherical shaped body was set so that a polarization direction of the spherical shaped body was consistent with this mark, and the spherical shaped body with a small projection having a diameter of 77 mm in which a convex side was a polycarbonate protective sheet layer and a concave side was a polyurethane sheet layer, was punched.

Using the same insert injection compression molding machine as that in Example 1, a polarizing molded article was prepared as follows:

The resulting 8C spherical shaped body was set and secured in a concave front mold. In this case, the spherical shaped body was arranged so that a polycarbonate protective sheet layer adhered to a front mold and a polyurethane sheet layer faced a movable mold.

The movable mold was clamped on the front mold to form a cavity for molding between the front mold and the movable mold.

As a thermally molding resin layer, a polyether series thermoplastic polyurethane "Elastran 1195ATR" (manufactured by Takeda Badisch Urethane Industries, Ltd.) in which a smoke color pigment had been dissolved, was used. The polarizing molded article was injection compression-molded at a highest temperature of 205° C., and the polyurethane sheet layer and the thermally molding resin layer of thermoplastic polyurethane were thermally adhered. Thereafter, the polarizing molded article was removed from the insert injection compression molding machine.

The resulting polarizing molded article was a 8C plano-lens having a thickness of 2.2 mm in which the polycarbonate protective sheet was arranged on a convex side and the thermally molding resin layer of thermoplastic polyurethane was incorporated and arranged on a concave side.

On both sides of the same article was formed a silane series hard coating film having a thickness of about 2.5 μm. Further, on a convex side was formed a mirror coating film by a vacuum deposition method.

The finished lens had the visible light transmittance of 8% measured at a center part, and exhibited the extremely tough mechanical properties. It had a polarization degree of 95% or greater.

According to present invention, a polarizing molded article having the impact resistance and a high polarization degree, and a process for preparing the same are provided.

What is claimed is:

1. A polarizing molded article, which comprises a polarizing plate-containing laminated structure, the laminated structure comprising:

two protective sheet layers;

a polarizer sheet layer having two sides and being held between the two protective sheet layers such that there is a protective sheet layer on both sides of the polarizer sheet layer;

a polyamide sheet layer connected to one of the two protective sheet layers with an adhesive, the polyamide sheet layer obtained by an extrusion molding or cast mold method; and a thermally molded resin layer thermally adhered to the polyamide sheet layer, wherein the molded article is molded into a lens.

2. The polarizing molded article according to claim 1, wherein the polyamide sheet layer is a transparent type polyamide sheet.

3. The polarizing molded article according to claim 1, wherein a resin of the thermally molding resin layer is a resin selected from the group consisting of polyamide, thermoplastic polyurethane and polycarbonate.

4. The polarizing molded article according to claim 3, wherein the polyamide as the resin of the thermally molding resin layer is a transparent type polyamide.

5. The polarizing molded article according to claim 1, wherein at least one of the surfaces of the polarizing molded article is covered with at least one of a functional coating selected from the group consisting of a hard coating, an anti-reflecting coating, an anti-fogging coating, an anti-staining coating and a mirror coating.

6. The polarizing molded article of claim 1, wherein the adhesive is a pressure-sensitive adhesive.

7. The polarized molded article of claim 1, wherein both of the two protective sheet layers each comprise an acyl-cellulose resin and both sides of the polarizer sheet layer are each connected to one side of one of the two protective sheet layers via an adhesive or pressure-sensitive adhesive.

8. The polarized molded article of claim 7, wherein the thermally molded resin layer can be thermally adhered to the polyamide sheet layer and is selected from the group consisting of polyamide, thermoplastic polyurethane, and polycarbonate.

9. A process for preparing a polarizing molded article as defined in claim 1, which comprises a first step of preparing a polarizing plate having a structure in which a polarizer sheet layer is held between two protective sheet layers, a second step of preparing a polarizing composite in which a polyamide sheet layer of the polarizing plate is connected to one of the two protective sheet layers with an adhesive or a pressure-sensitive adhesive, a third step of heat press-molding the polarizing composite into a spherical shaped body, and a fourth step of thermally molding a thermally molding resin layer on the polyamide sheet layer of the spherical shaped body.

10. The process for preparing a polarizing molded article according to claim 9, wherein a heat press molding machine for heat press-molding a polarizing composite into a spherical shaped body comprises a planar support having a hole having a size similar to that of the spherical shaped body in a planar direction, a clamp for securing the polarizing composite around the hole of the support, and a heatable anvil having a tip shape corresponding to a size and a curvature of the spherical shaped body, the anvil has a structure fittable in the support, and a third step of heat press-molding the polarizing composite into the spherical shaped body comprises [mounting the polarizing composite on the support-securing the polarizing composite on the support with a clamp-fitting an anvil and performing heat press molding-returning the anvil and the clamp to an original position-removing the spherical shaped body] as one cycle.

11. The process for preparing a polarizing molded article according to claim 10, wherein the polarizing composite is mounted on the support and is heat press-molded so that the polyamide sheet layer is on a convex side of the polarizing shaped body, the finished spherical shaped body is reverted, whereby the spherical shaped body is arranged so that the polyamide sheet layer is on a concave side.

12. The process for preparing a polarizing molded article according to claim 9, wherein an insert injection molding machine comprises a front mold having a curvature similar to that of the spherical shaped body and for securing the spherical shaped body and a movable mold having an arbitrary curvature, and a fourth step of insert injection-molding the polarizing molded body comprises [arranging and securing the spherical shaped body in the front mold so that the polyamide sheet layer is inside the mold-clamping the movable mold-injection-molding the thermally molding resin layer-removing the polarizing molded article] as one cycle.

* * * * *